Sept. 7, 1954 W. T. BROWN 2,688,205
FISH LURE
Filed Aug. 19, 1952
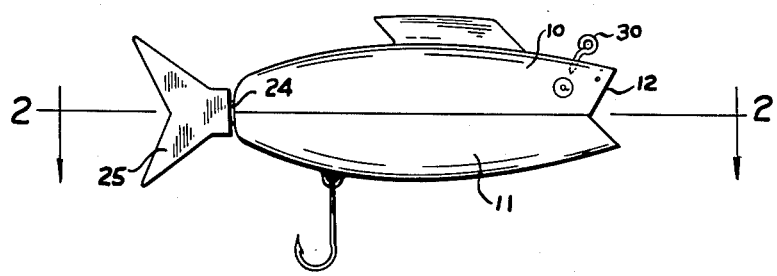
Fig. 1
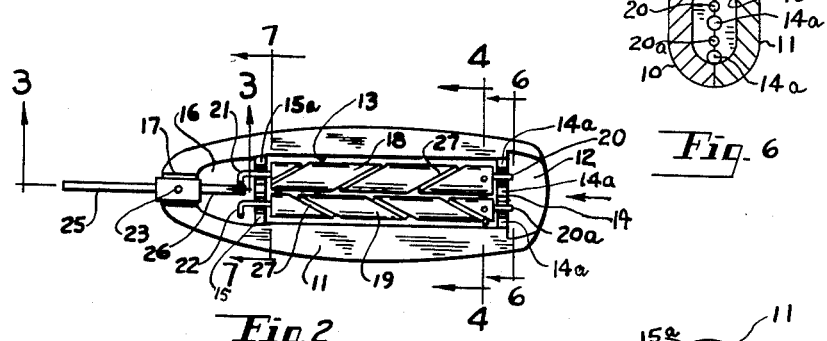
Fig. 2
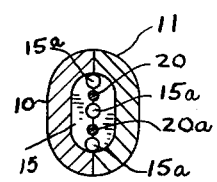
Fig. 6
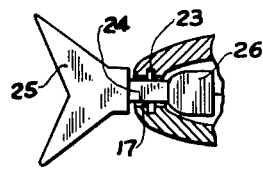
Fig. 3
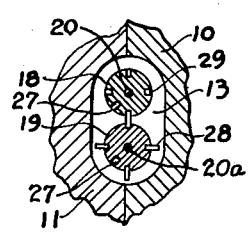
Fig. 4
Fig. 7
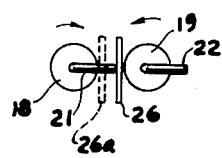
Fig. 5
INVENTOR.
WILLIAM T. BROWN.
BY Louis Chayka
ATTORNEY.

Patented Sept. 7, 1954

2,688,205

UNITED STATES PATENT OFFICE 2,688,205

FISH LURE

William T. Brown, Detroit, Mich.

Application August 19, 1952, Serial No. 305,236

2 Claims. (Cl. 43—26.2)

The object of my improvement is to provide a lure in the form of a fish and to make it lifelike by providing it with a movable oscillating tail member. While a number of lures including the above specified feature are already known, the lure of my invention is characterised by a simple mechanism and by the ability of said lure to move forwardly in a straight line. While the principle of the mechanism is well known, the arrangement of parts shown by me displays an inventive feature because of which the lure is more efficient, as will be set out with reference to the accompanying drawing in which:

Fig. 1 is a side elevational view of my fish lure;

Fig. 2 is a plan view of the lower section of the lure as detached from its complementary upper section;

Fig. 3 is a fragmentary sectional view on line 3—3 of Fig. 2;

Fig. 4 is a sectional view on line 4—4 of Fig. 2;

Fig. 5 is a diagrammatic presentation disclosing an oscillating member which forms a part of the tail of the lure and a plurality of pins actuating said member and being actuated in turn by a pair of rollers;

Fig. 6 is a sectional view on line 6—6 of Fig. 2;

Fig. 7 is a sectional view on line 7—7 of Fig. 2.

Similar numerals refer to similar parts throughout the several views.

The body of the lure, which is preferably to be made of a plastic material, is composed of two parts, the upper one 10 and the lower one 11, the two parts being adapted to be held together by any suitable means, including a water-proof cement.

The body of the lure as a whole is open at the front at 12, the open front simulating the open mouth of a fish. On the inside the body forms an oblong chamber 13, said chamber being separated from the open mouth by a partition 14. A similar partition 15 located in the rear portion of the body separates said chamber 13 from a cavity 16, the latter opening outwardly by means of a restricted aperture 17.

Located within the chamber, side by side, are two rollers 18 and 19.

The first-named roller 18 is mounted upon a shaft 20 which at its front end is journalled for rotation in said partition 14. At the opposite end, the shaft is journalled in said partition 15 and terminates with a radially-turned pin 21. The other roller, 19, is axially mounted upon a similar shaft, 20a, the end portions of the shaft being similarly journalled in partitions 14 and 15, respectively, the shaft terminating at the rear end with a pin 22. The pins, as shown in Fig. 2, are turned in the same direction.

Pivotally secured within aperture 17 by means of a vertically-disposed pin 23 for lateral reciprocal movement is a member 24 which terminates outwardly of the body of the lure and is secured to a vertically-disposed tail 25 of the lure. At the opposite end said member 24 is connected to a vertically-disposed plate 26. The plate in the assembled lure is located midway between said pins 21 and 22 and is adapted to be actuated by said pins on contact therewith.

It will be noted that each roller is provided with a spiral groove 27 leading from one end thereof to the other and that the direction of the spirals on the two rollers are opposed to each other. At one end one of the rollers is provided with a plurality of radially-projecting teeth 28 equally spaced from each other, the teeth being adapted to fit into radially-disposed sockets 29 on the adjoining roller. The arrangement is equivalent to a pair of gears, the purpose of the arrangement being to keep both rollers rotating at the same speed.

As shown in Fig. 6, partition 14 is provided with circular bearings for the ends of shafts 20 and with a plurality of openings 14a. The rear partition 15, as shown in Fig. 7, is constructed similarly, including bearings for shafts 20 and a plurality of openings 15a. It will be understood that openings 14a in the front partition 14 serve as an inlet for water entering the interior of the lure for its action upon the rollers and that the openings 15a within partition 15 serve as an outlet for water after it has passed over the rollers on its way outwardly of the lure.

The operation of the lure is quite obvious. As the lure which is attached to a fish line by means of an eyelet 30 projecting from the forward end of the lure is drawn through water the rollers will be set rotating by water entering the interior of the lure through openings 14a and forcing its way through said spiral grooves 27. The rotating rollers will cause pins 21 and 22 to push plate 26 in a reciprocating movement, causing it to swing in a fan-like motion back and forth. This is indicated in Fig. 5 where plate 26 in solid lines shows one extreme position of said plate and where the same plate in dotted lines 26a indicates the other extreme position of said plate in the course of its complete cycle. Having passed through the body of the lure, the water leaves said lure through the aperture 17 housing member 24.

It will be understood that some changes may be made in the structure of my lure without departing from the inventive principle disclosed herein.

What I, therefore, wish to claim is as follows:

1. In a fish lure simulating the shape of a fish having an open mouth, a body provided with an oblong inner chamber and having an outlet at the rear portion, two rollers mounted horizontally within the chamber parallel to each other, the rollers being provided with spiral grooves in their surfaces throughout their length with the direction of the spirals opposed to each other and being geared for rotation in opposite directions, an axial shaft included in each of said rollers terminating at the rear portion with a radial pin, a member pivoted within the rear outlet for lateral reciprocal movement, one end of the member terminating outwardly of the rear end of the body of the lure, a flat, vertically-disposed tailpiece connected to said one end of the member and a vertically-disposed plate secured within the body of the lure to the other end of said member, the rollers being adapted to be rotated by flow of water into the chamber through said open mouth and to cause one radial pin to bear against said plate from one side to swing said plate in one direction, then to cause the other radial pin to bear against said plate from the opposite side to swing said plate in the opposite direction.

2. In a fish lure simulating a fish and including a hollow body having an open mouth and an outlet in the rear portion of said body, a member pivoted within the outlet for lateral reciprocal movement, one end of the member extending rearwardly and out of the body, a flat, vertically-disposed tailpiece affixed to said end, a vertically-disposed plate secured within the body of the lure to the other end of said member, both the tailpiece and the plate being disposed in the same plane, two parallel rollers mounted horizontally within the body parallel to each other and geared for rotation in opposite directions, the surface of each roller being provided with a spiral groove, the spiral groove on one roller winding in the opposite direction to that of the groove in the other roller, and a shaft included in each of said rollers and terminating at its rear end in a radially-extending pin adapted to bear against one side of said plate, the rollers being adapted to be rotated by a flow of water along the grooves thereon, first to cause the radial pin on one of said rollers to bear laterally against the flat plate to swing said plate in one direction, then to cause the radial pin on the other of said rollers to bear against the flat plate from the opposite side to swing said plate in the reverse direction.

References Cited in the file of this patent
UNITED STATES PATENTS

| Number | Name | Date |
|---|---|---|
| 331,496 | Hall | Dec. 1, 1885 |
| 966,068 | Williamson | Aug. 2, 1910 |
| 1,546,188 | Baldwin | July 14, 1925 |
| 1,842,127 | Stickel et al. | Jan. 19, 1932 |
| 2,389,423 | Evans | Nov. 20, 1945 |
| 2,467,151 | Nordquist | Apr. 12, 1949 |
| 2,472,505 | Yocam et al. | June 7, 1949 |
| 2,530,008 | Fey | Nov. 14, 1950 |
| 2,534,639 | Twist | Dec. 19, 1950 |